US009415849B2

(12) United States Patent
Jobs et al.

(10) Patent No.: US 9,415,849 B2
(45) Date of Patent: Aug. 16, 2016

(54) REMOTE MOTION CONTROL USING A WIRELESS MOBILE DEVICE

(71) Applicants: Savant Systems, LLC, Hyannis, MA (US); Apple, Inc., Cupertino, CA (US)

(72) Inventors: Steven P. Jobs, Palo Alto, CA (US); Robert P. Madonna, Osterville, MA (US); Michael C. Silva, East Sandwich, MA (US); Cameron Pulsford, Marstons Mills, MA (US); Nicholas J. Cipollo, Boston, MA (US)

(73) Assignees: Savant Systems, LLC, Hyannis, MA (US); Apple, Inc., Cupertino, CA (US)

( * ) Notice: Subject to any disclaimer, the term of this patent is extended or adjusted under 35 U.S.C. 154(b) by 65 days.

(21) Appl. No.: 14/211,774

(22) Filed: Mar. 14, 2014

(65) Prior Publication Data

US 2014/0277850 A1 Sep. 18, 2014

Related U.S. Application Data

(60) Provisional application No. 61/790,512, filed on Mar. 15, 2013.

(51) Int. Cl.
*B63H 19/00* (2006.01)
*G05D 1/00* (2006.01)
*H04M 1/725* (2006.01)

(52) U.S. Cl.
CPC .............. *B63H 19/00* (2013.01); *G05D 1/0022* (2013.01); *H04M 1/72533* (2013.01); *H04M 2250/22* (2013.01)

(58) Field of Classification Search
CPC ...................................................... B60R 25/00
USPC ............................................................ 701/2
See application file for complete search history.

(56) References Cited

U.S. PATENT DOCUMENTS

| 4,739,236 A | 4/1988 | Burkenpas |
| 6,264,513 B1 | 7/2001 | Marsh |

(Continued)

FOREIGN PATENT DOCUMENTS

GB 2460326 A 12/2009

OTHER PUBLICATIONS

"Notification of Transmittal of the International Search Report and the Written Opinion of the International Searching Authority, or the Declaration," International Filing Date: Mar. 14, 2014, International Application No. PCT/US2014/027548, Applicant: Savant Systems, LLC., Date of Mailing: Jul. 29, 2014, pp. 1-12.

(Continued)

*Primary Examiner* — John Q Nguyen
*Assistant Examiner* — Anshul Sood
(74) *Attorney, Agent, or Firm* — Cesari and McKenna, LLP; James A. Blanchette

(57) ABSTRACT

In one embodiment, a general-purpose wireless mobile device having a touch-sensitive screen and executing a remote control application is used to remotely control a vehicle (e.g., a marine vessel). The general-purpose wireless mobile device communicates via a wireless network with an interface (e.g., a server) that is coupled to an electronic control system of the vehicle (e.g., the vessel). In operation, environmental information and/or system status information is collected through the electronic control system, propagated to the interface (e.g., server), and then sent over the wireless network to the wireless mobile device. Similarly, control input is sent over the wireless network to the interface (e.g., server), which passes the information to the electronic control system, which in turn issues appropriate control signals to the vehicle subsystems (e.g., marine subsystems) to control the motion of the vehicle (e.g., the vessel).

18 Claims, 6 Drawing Sheets

(56) References Cited

U.S. PATENT DOCUMENTS

| | | | |
|---|---|---|---|
| 6,273,771 | B1 | 8/2001 | Buckley et al. |
| 6,520,105 | B2 | 2/2003 | Koda et al. |
| 6,655,309 | B1 | 12/2003 | Stephens |
| 6,909,946 | B1 | 6/2005 | Kabel et al. |
| 7,104,212 | B2 | 9/2006 | Brianza |
| 7,323,970 | B1 * | 1/2008 | Murray .................. B60R 25/04 340/426.11 |
| 7,702,426 | B2 | 4/2010 | Ito et al. |
| 8,275,317 | B2 | 9/2012 | Frost et al. |
| 2003/0092331 | A1 | 5/2003 | Okuyama |
| 2004/0090315 | A1 * | 5/2004 | Mackjust .............. B60R 25/104 340/426.13 |
| 2006/0061458 | A1 | 3/2006 | Simon et al. |
| 2006/0155431 | A1 | 7/2006 | Berg et al. |
| 2009/0037040 | A1 * | 2/2009 | Salmon .................. B63B 17/00 701/21 |
| 2012/0015566 | A1 * | 1/2012 | Salmon .................. B63H 21/21 440/1 |
| 2014/0320296 | A1 * | 10/2014 | Thurber ................ G08B 21/14 340/632 |

OTHER PUBLICATIONS

"Dual Band: Yacht Controller Background and Features," Yacht Controller, <http://www.yachtcontroller.com/dual-band>, 2008, pp. 1-3.

Pietak, Andrzej, et al., "On the Adaptation of CAN BUS Network for Use in the Ship Electronic Systems," Polish Maritime Research, No. 4(62), vol. 16, 2009, pp. 62-69.

* cited by examiner

REMOTE MOTION CONTROL USING A WIRELESS MOBILE DEVICE

RELATED APPLICATIONS

The present application claims the benefit of U.S. Provisional Application No. 61/790,512 filed on Mar. 15, 2013, entitled "Remote Motion Control Using a General-Purpose Wireless Mobile Device", the contents of which are incorporated by reference herein in their entirety.

BACKGROUND

1. Technical Field

The present disclosure relates generally to vehicle motion control and more specifically to techniques for remote motion control of a vehicle (e.g., a marine vessel) using a general-purpose wireless mobile device having a touch-sensitive screen.

2. Background Information

A variety of types of vehicles have some sort of main control interface through which an operator can monitor and control the vehicle. Typically, the main control interface is coupled via a wired connection to lower level systems. For example, in modern marine vessels (e.g., yachts), a main helm station is generally provided through which an operator (e.g., the captain) may monitor and control the vessel. The main helm station typically is coupled via a wired connection to an electronic control system of the vessel, which is in turn coupled to various sensors and marine subsystems onboard the vessel. Environmental information and system status information may be collected by sensors, under the direction of the electronic control system, and passed back over the wired connection for displayed upon the main helm station. Control input entered by the operator on the main helm station may be passed over the wired connection to the electronic control system, which issues control signals to the marine subsystems to control motion, and potentially other functions, of the vessel.

In a typical arrangement, the main helm station is centrally located, often on the main level of the vessel. While visibility from such a location may be adequate in most situations, in some situations it may be insufficient. For example, if the vessel is maneuvering in port to moor or dock, an operator at the main helm station may not have adequate line of sight to judge the position of the vessel with respect to the edge of the dock or mooring.

Traditionally, a crew member is stationed on the deck of the vessel at a position that provides better visibility, for example, by the rail. The crew member is tasked with verbally relaying information to the operator at the main helm station. For example, as the vessel approaches the dock or mooring, the crew member may relay back relevant distances and suggest course corrections. However, this relay of information is problematic. The crew member may misspeak, or the operator may mishear a crucial piece of information. Further, the crew member may lack the experience of the operator, and this lack of experience may cause them to misestimate distances or suggest incorrect course corrections. Still further, there is an inherent delay to this sort of relay of information, and this delay may be problematic in some situations.

In attempts to address these issues, some vessels employ stationary secondary helm stations coupled to the electronic control system via wired connections. These stationary secondary helm stations may be located at positions on the deck of the vessel where better visibility is available. An operator may temporarily take control of vessel from one of these stationary secondary helm stations. However, while this approach may be somewhat of an improvement over verbally relaying information back, it still suffers from several shortcomings. While a given stationary secondary helm station may be located at a better position than the main helm station for performing one type of maneuver, it may be in a poorer location when another type of maneuver is required. Accordingly, to be effective, there typically needs to be several secondary helm stations dispersed about the vessel, to provide coverage for common maneuvers. The need for duplicative secondary helm stations, and the wiring required to support each secondary helm station, adds expense to the vessel. Further, duplicative secondary helm stations consume space that could be better utilized for other purposes.

In further attempts to address these issues, some vessels employ dedicated wireless remote controllers that include physical buttons or switches for controlling the vessel. A dedicated wireless remote controller may include a transmitter configured to transmit upon one or more predefined radio frequency bands. However, while this approach may also be somewhat of an improvement over verbally relaying information, it too suffers from several shortcomings. Dedicated wireless remote controllers may be inconvenient. An operator may desire remote control only few times in a given voyage, for example, when entering or leaving port. During the potentially long stretches of time between their use, dedicated wireless remote controller may be set aside, to be forgotten about or lost. An operator generally has little reason to carry them about on their person, due to their infrequent use. Accordingly, when an opportunity for their use does arise, they are typically not at hand, and an operator may need to search about the veseel to locate the dedicated wireless remote controller, before it can even be used. Further, many dedicated wireless remote controllers lack sufficient safeguards to ensure that input entered on the dedicated wireless remote controller is being received in a timely and accurate manner by the electronic control system of the vessel. This may create a potential for catastrophic failure, for example, where an operator believes that control input they have entered will be acted upon, only to find that it is not. Further, dedicated wireless remote controllers typically do not provide sufficient environmental and system status information to permit more advanced types of control.

Accordingly, there is a need for improved techniques for remote motion control of a vehicle (e.g., a marine vessel), that may address some, or all, of these shortcomings.

SUMMARY

In one embodiment, a general-purpose wireless mobile device having a touch-sensitive screen and executing a remote control application is used to remotely control a vehicle (e.g., a marine vessel, such as a yacht). The general-purpose wireless mobile device communicates via a wireless network with an interface (e.g., a server) that is coupled to an electronic control system of the vehicle (e.g., the vessel). The electronic control system is coupled to, and receives information from, sensors that collect environmental information (e.g., wind speed, wind direction, water depth, etc.) and/or system status information (e.g., engine speed, transmission settings, etc.) for the vehicle (e.g., the vessel). The electronic control system is also coupled to, and provides control signals to, vehicle subsystems (e.g., marine subsystems, such as throttle controllers, transmission controllers, rudder actuators, etc.) that implement motion and other function control. In operation, environmental information and/or system status information is collected through the electronic control system, propagated to the interface (e.g., the server), and then sent over the wireless network to the wireless mobile device. Similarly, control input is sent over the wireless network to the interface (e.g., theserver), which passes the information to the electronic control system, which in turn issues appropriate control signals to vehicle subsystems (e.g., marine subsystems) to control the motion of the vehicle (e.g., the vessel).

In one embodiment, the remote control application includes a packet delivery module, a network health monitor, and a user interface (UI) module. The packet delivery module is configured to exchanging packets with the interface to receive environmental information and/or system status information, and to pass thereto control input, when remote motion and other function control is engaged. The packet delivery module is further configured to implement an acknowledgment (ACK)/negative acknowledgment (NACK) mechanism, and to implement data collection functions to obtain packet data. The network health monitor is configured to use the packet data obtained by the to calculate one or more performance metrics, determine therefrom a network health score, and based on the network health score, permit or disable remote motion and other function control. The UI module is configured to display environmental information and/or system status information for the vehicle (e.g., vessel) in a UI on the touch-sensitive screen, and to receive control input indicating desired motion and other function control via the UI, when such remote control is permitted and engaged. An interface element of the UI indicates when remote motion and other function control is engaged, and the wireless mobile device is has control responsibility, and when remote motion and other function control is disabled, and control responsibility is returned to a main control interface (e.g., a stationary main helm station) of the vehicle (e.g., the vessel).

It should be understood that a variety of other embodiments may be implemented, including other embodiments discussed below, and variations thereof. This Summary is intended simply as an introduction to the reader, and does not indicate or imply that the techniques mentioned herein are necessary, or essential, to the invention.

BRIEF DESCRIPTION OF THE DRAWINGS

The description below refers to the accompanying drawings, of which.

DETAILED DESCRIPTION

In the below examples, reference is made to an example marine vessel, example components of that vessel, and example information relevant to that vessel. However, it should be understood that the techniques are equally applicable to other types of vehicles, having other components, and to which other information is relevant. Where marine specific components and information is mentioned, it should be understood that the description is equally applicable to more general types of components and information, including those mentioned in the Summary.

Figure 1:
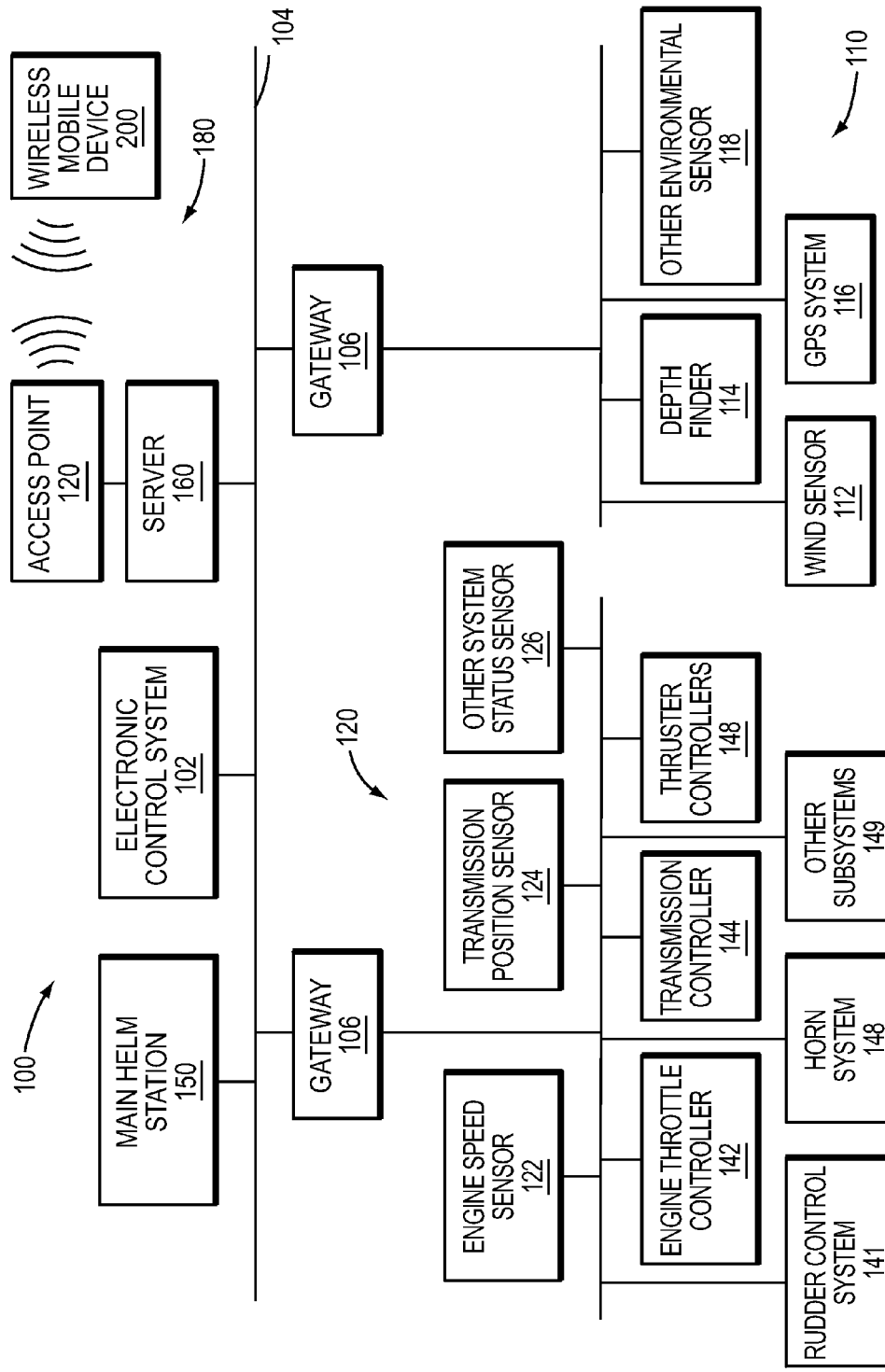
FIG. 1 is a block diagram of an example architecture for remote motion and other function control.

FIG. 1 is a block diagram of an example architecture 100 for remote motion and other function control. At the heart of the architecture is an electronic control system 102 executing control software. The electronic control system 102 is coupled via a wired network 104, for example, to one or more gateways 106, which are in turn coupled to sensors and marine subsystems. The sensors include environmental sensors 110 that collect information regarding the physical environment about the vessel, for example, a wind sensor 112 that determines a wind speed and wind direction, a depth finder 114 that determines a water depth, a global positioning system (GPS) 116 that determines a geographic location, as well as other environmental sensors 118. The sensors further include system status sensors 120 that collect information about marine subsystems, for example, an engine speed sensor 122 that measures engine revolutions per minute (RPM), a transmission position sensor 124 that determines clutch and/or other transmission settings, as well as other system status sensors 126. The marine subsystems 140 include motion control subsystems, for example, an engine throttle controller 142 that controls engine speed, a transmission controller 144 that controls transmission settings, thruster controllers 146 that control thrusters (e.g., bow and stern thrusters), a rudder control system 147 that controls primary steering, a horn system 148 that provide auditory alerts, and other subsystems 149.

A main helm station 150, through which an operator (e.g., the captain) of the vessel may monitor and control the motion and other functions of the vessel is coupled to the electronic control system 102 via the wired network 104. Environmental and/or system status information from the sensors is processed by the electronic control system 102, and passed back over the wired network 104 for displayed upon the main helm station 150. Control input entered by the operator on the main helm station 150 is passed via the wired network 104 to the electronic control system 102, which issues control signals to the marine subsystems 140.

An interface, such as a server 160, is coupled to the electronic control system 102 via the wired network 104. The server 160 may also be coupled to a wireless access point 170 that supports a wireless network (e.g., an IEEE 802.11 wireless local area network (WLAN)) 180. In one embodiment, the wireless network 180 may utilize a connectionless transport layer protocol (e.g., User Datagram Protocol (UDP)) that provides unreliable, unordered service. However, it should be understood that other transport layer protocols may alternatively be employed.

A general-purpose wireless mobile device 200 having a touch-sensitive screen communicates with the server via the wireless network 180, by exchanging packets (e.g., UDP packets). As used herein, the term "general-purpose wireless mobile device" refers to an electronic device having wireless communication capabilities that is adapted to be transported on one's person, and that includes a general-purpose operating system capable of executing a variety of types of software applications, including applications unrelated to vehicle motion control. Devices such as tablet computers (e.g., the iPad® tablet available from Apple, Inc.), smartphones (e.g., the iPhone® multimedia phone available from Apple, Inc.), and certain portable media players (e.g., such as the iPod® touch portable media player available from Apple, Inc.) that execute general-purpose operating systems (e.g., the IOS® operating system available from Apple, Inc.) are considered general-purpose wireless mobile devices.

In operation, environmental and/or system status information is collected through the electronic control system 102, propagated to the server 160, and then sent over the wireless network 180 to the wireless mobile device 200. Similarly, control input is sent over the wireless network 180 to the server 160, which passes the information to the electronic control system 102, which in turn issues appropriate control signals over the wired network 104 to marine subsystems 140 to control the motion and other functions of the vessel.

Figure 2:
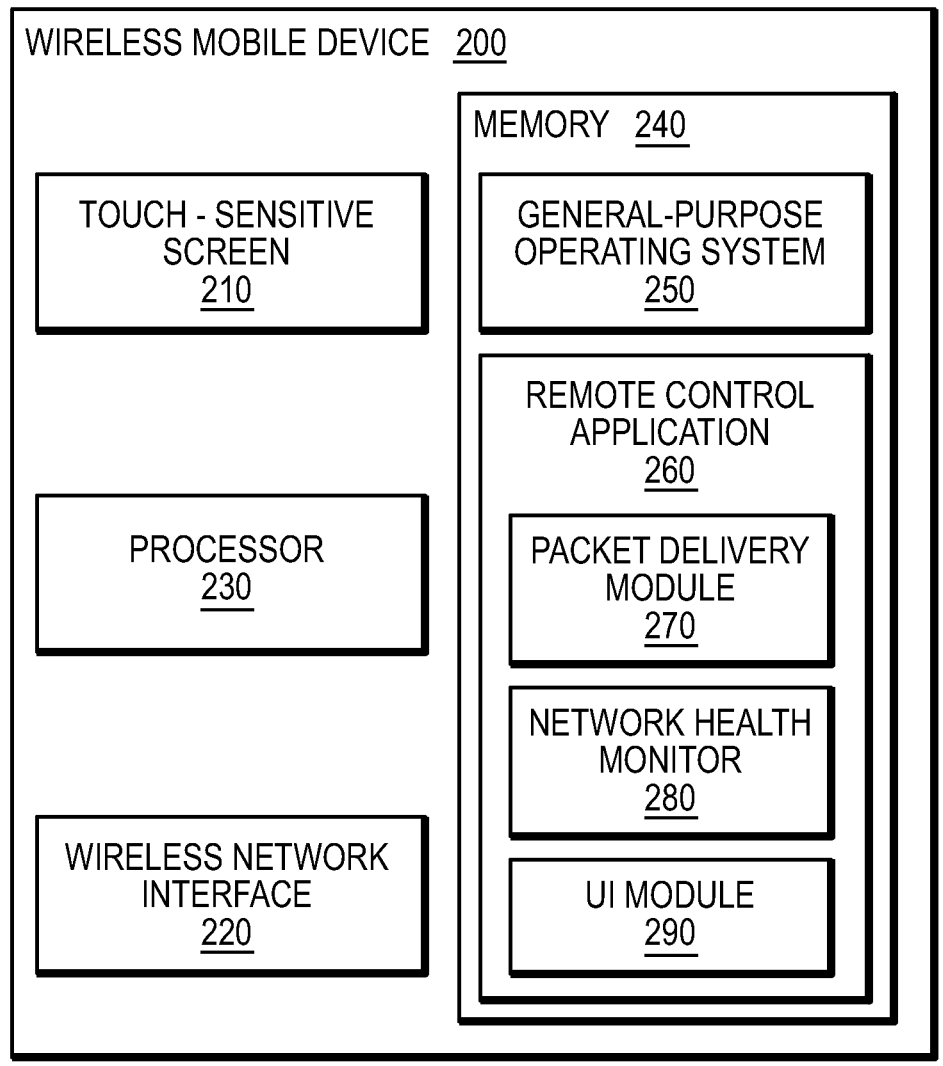
FIG. 2 is a block diagram of an example general-purpose wireless mobile device having a touch-sensitive screen.

FIG. 2 is a block diagram of an example general-purpose wireless mobile device 200 having a touch-sensitive screen 210. The touch-sensitive screen 210 is configured to visually display information and to received input, including touches and gestures entered by an operator. The wireless mobile device 200 further includes a wireless network interface 220, a processor 230, a memory 240, and other components. The wireless network interface 220 includes transceiver circuitry for sending and receiving packets over a wireless network (e.g., an IEEE 802.11 WLAN). The processor 230 includes logic configured to execute software and manipulate data from data structures. The memory 230 includes a plurality of storage locations for storing the software and the data structures.

At least some of the software and data structures stored in the memory implement a general-purpose operating system 250, that functionally organizes the wireless mobile device 200. The general-purpose operating system 250 may be an IOS® operating system, or another type of operating system, that is capable of executing a variety of types of software applications, including applications unrelated to vehicle motion control.

A further portion of the software and data structures stores a remote control application 260 that is utilized to remotely control motion, and potentially other functions, of the vessel. The remote control application 260 includes a packet delivery module 270, a network health monitor 280, and a user interface (UI) module 290. The packet delivery module 270 is configured to exchange packets with the server 160 to receive the environmental information and/or system status information, and to pass thereto control input, when remote motion and other function control is engaged. The packet delivery module 270 is further configured to implement an acknowledgment (ACK)/negative acknowledgment (NACK) mechanism, and to implement data collection functions to obtain packet data. The network health monitor 280 is configured to use the packet data obtained by the packet delivery module 270 to calculate one or more performance metrics, determine therefrom a network health score, and based on the network health score, permit or disable remote motion and other function control from the wireless mobile device 200. The UI module 290 is configured to display environmental and/or system status information for the vessel in a user interface (UI) on the touch-sensitive screen 210, and to receive control input indicating desired motion and other function control via the UI, when remote control is permitted. This control input is passed to the packet delivery module 270 for transmission back to the server 160 over the wireless network 180, when remote control is permitted.

In one embodiment, the packet delivery module 270 utilizes features of a data-interchange format (e.g., a JavaScript Object Notation (JSON) data-interchange format)to implement the ACK/NACK mechanism, and to obtain at least some of the packet data. The data-interchange format may be used to implement certain aspects of reliable ordered service, on top of an underlying connectionless transport protocol (e.g., UDP) used in the wireless network 180, which may inherently provides only unreliable, unordered service.

Figure 3:
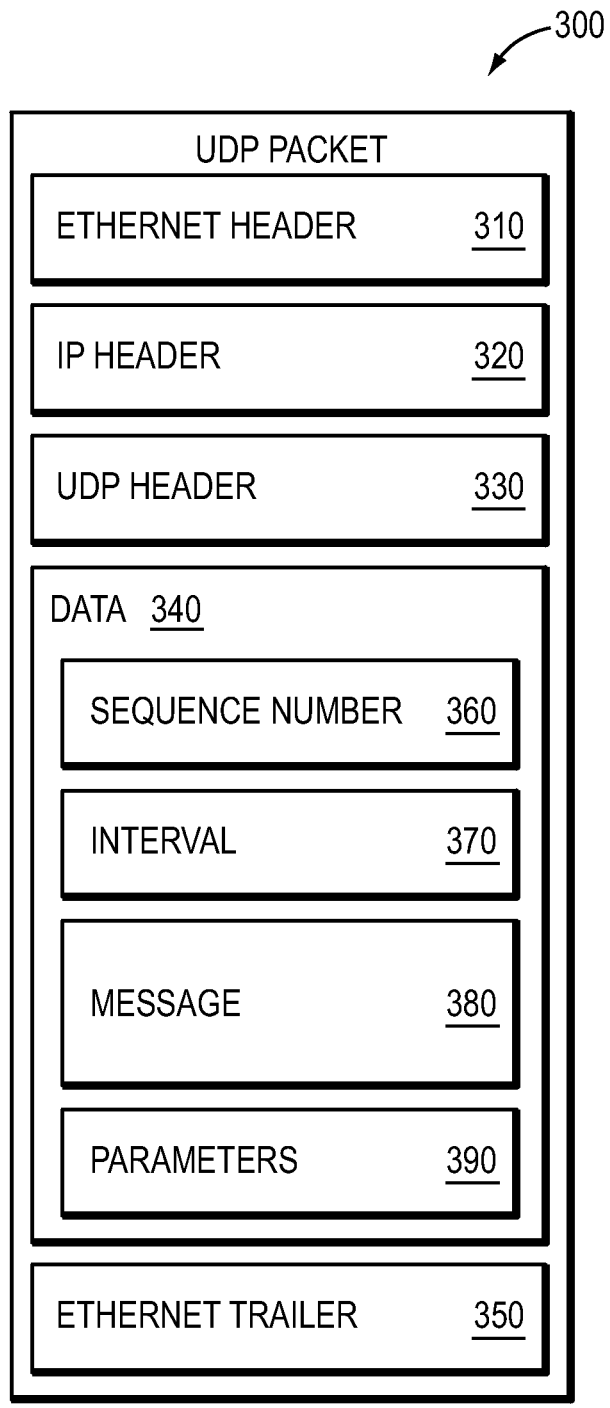
FIG. 3 is a block diagram of an example packet structured according to a JavaScript Object Notation (JSON) data-interchange format.

FIG. 3 is a block diagram of an example packet 300 structured according to a JSON data-interchange format. In this example, the packet 300 is a UDP packet. The packet 300 includes an Ethernet header 310 having source and destination media access control (MAC) addresses, an EtherType protocol identifier, tags, and other information. An Internet Protocol (IP) header 320 includes source and destination IP addresses, a total packet length, a fragment identification, an offset, and other information. Further, a UDP header 330 includes a source port identifier, a destination port identifier, a length and other information.

The data portion 340 of the packet 300 is arranged as a JSON dictionary, having a plurality of keys and associated values. A sequence number key and associated value (e.g., an 8-byte integer value) 360 indicates the packet's relative order in relation to other packets exchanged between a same sender (server 160) and receiver (wireless mobile device 200) pair. As noted above, such sequence information would typically not be available within a UDP packet. An interval key and associated value 370 (e.g., an 8-byte integer value of milliseconds) indicates an a sending-side time interval, between transmission of a previous packet from the sender (server 160) to the receiver (wireless mobile device 200) and transmission of the current packet from the sender (server 160) to the receiver (wireless mobile device 200). A message key and associated value (e.g., a variable length string of data) 380 provides a message payload for passing information, control input, indications of acknowledgment or negative acknowledgment, or other purposes, depending on the packet's function. Further, a parameters key and associated value 390 indicates the meaning of information in the message payload.

In one embodiment, the packet delivery module 270 may utilize a packet of such format to implement the ACK/NACK mechanism. In response to receipt of a packet 300 from the sender (server 160), where the sequence number key and associated value 360 indicates a sequential sequence number (as compared to a previous packet), the packet delivery module 270 returns a packet that operates as an ACK. In response to a packet from the server 160 that includes a non-sequential sequence number (as compared to the previous packet), the packet delivery module 270 returns one or more packets that operate as NACKs, sending them at regular intervals until a packet with the expected sequence number is received. Any other packets with different sequence numbers are queued by the packet delivery module 270 while awaiting a packet with the expected sequence number.

In addition to the ACK/NACK mechanism, the packet delivery module 270 is further responsible for reading and detecting certain packet data. The packet delivery module 270 reads the sending-side time interval from the interval key and associated value 370 of each received packet. Further, the packet delivery module 270 detects, working in conjunction with hardware features of the wireless network interface 220, a receiving-side time interval between reception of a previous packet from the sender (server 160) at the receiver (wireless mobile device 200) and reception of the current packet from the sender (server 160) at the receiver (wireless mobile device 200). Further, the packet delivery module 270 tracks a number of times, if any, either the sender (server 160) or receiver (wireless mobile device 200) may request a packet to be retransmitted (e.g., due to data corruption).

In one embodiment, the network health monitor 280 is configured to use the packet data to calculate one or more performance metrics, determine therefrom a network health score, and based on the network health score, permit or disable remote motion and other function control from the wireless mobile device 200. In one implementation, the network health monitor 280 utilizes a sliding window to select packets whose packet data is used to calculate at least some of the one or more performance metrics. The sliding window may prevent the packet data from becoming stale, making it less likely that extremely good performance during one time period will be able to mask extremely bad performance during another time period. The sliding window is defined by two parameters: a predetermined length, indicating a period of time a packet may be maintained in the sliding window; and a predetermined size, indicating a maximum number of packets that can be maintained in the sliding window at any given time. The predetermined length and predetermined size may be selected based on the particular type and configuration of wireless network 180.

The one or more performance metrics calculated by the network health monitor 280 include an instantaneous jitter metric, a cumulative delay metric, an average jitter metric, a retransmission metric, and/or other metrics descriptive of network performance. The instantaneous jitter metric measures unexpected packet delay variation for a particular packet, and is based on a comparison of a) a difference between the sending-side time interval and the receiving-side time interval for the particular packet, and b) a predetermined threshold. The cumulative delay measures implications of unexpected packet delay variation over time, and is based on a comparison of a) a sum of instantaneous jitter values of packets that fall within the sliding window, and b) a predetermined threshold. The average jitter metric also measures implications of unexpected packet delay variation over time, and is based on an average of instantaneous jitter. This average is compared with a predetermined threshold, and weighted for deviation from the threshold. Further, the retransmission metric measures retransmission frequency, and is based on a number of times either the sender (server 160) or receiver (wireless mobile device 200) has requested packets that fall within the sliding window to be retransmitted. It should be understood that a wide variety of other performance metrics may alternatively be employed, and that the above performance metrics may be calculated in alternative manners.

The network health monitor 280 combines the one or more performance metrics (e.g., using a weighted average function) to produce a network health score that is descriptive of the reliability of the wireless network 180. The network health monitor 280 then compares the network health score to a health threshold to determine if the wireless network 180 offers sufficient reliability to permit remote motion and other function control. If the network health score meets the threshold, the wireless network 180 is determined to be sufficiently reliable, and remote motion and other function control is permitted. If the network health score does not meet the threshold, the wireless network 180 is determined to be insufficiently reliable, and remote motion and other function control is disabled, and control responsibility is returned to the main helm station 150 of the vessel.

Control responsibility may be returned to the main helm station 150 using an explicit or a passive mechanism. In an explicit mechanism, the network health monitor 280 may send one or more packets including an indication that control should be returned. Alternatively, in a passive mechanism, information may be withheld. For example, control input received in the UI is not propagated further, and the packet delivery module 270 is triggered to withhold ACKs to the server 150 for received packets. The lack of ACKs will cause the server 160 to rapidly detect a problem, and to return control to the stationary main helm station 150.

Figure 4:
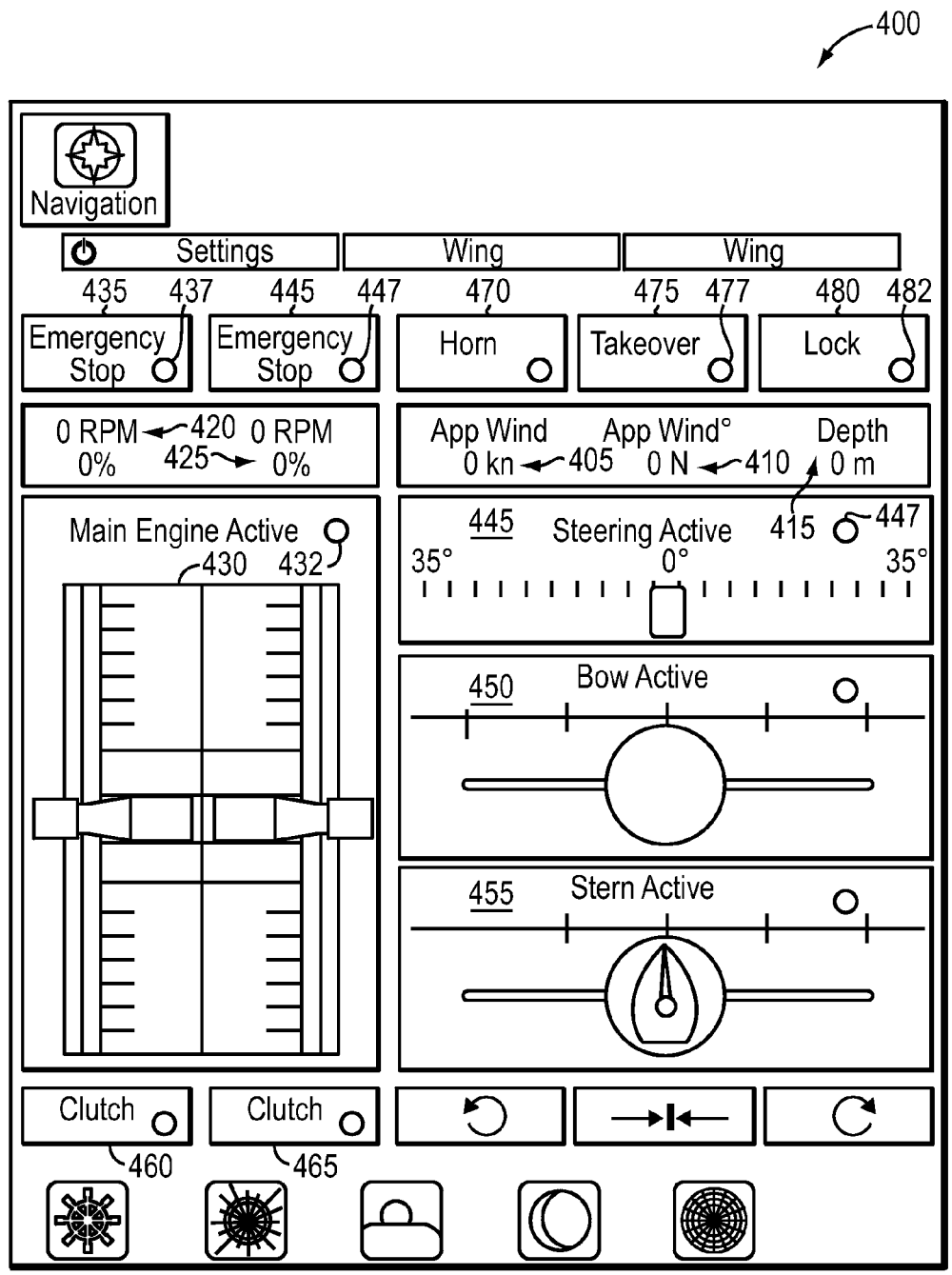
FIG. 4 is a screen shot of an example user interface (UI) that may be shown by a UI module on the touch-sensitive screen of the wireless mobile device.

FIG. 4 is a screen shot of example UI 400 that may be shown by the UI module 490 on the touch-sensitive screen 410 of the wireless mobile device 200. The UI 400 includes a plurality of interface elements for displaying environmental information, including a wind speed readout 405, a wind direction readout 410 and a water depth readout 415. The UI 400 further includes a plurality of interface elements for displaying system status information, including first and second engine speed readouts 420, 425. Additional interface elements are provided for receiving control input (e.g., in the form of touches or gestures) representing desired changed in motion or other functions. The additional interface elements include a main engine control slider 430, first and second emergency stop buttons 435, 440, a rudder control slider 445, bow thruster controls 450, 455, transmission control buttons 460, 465, and a horn control button 470. At least some of the interface elements include sub elements that provide additional information, or are used to receive additional input. For example, the main engine control slider 430 includes an indicator light 432 that indicates when the main engines are active, the first and second emergency stop buttons 435, 440 include indicator lights 437, 442 that indicate an emergency stop is in progress, the rudder control slider 445 includes an indicator light 447 that indicates when the rudder is being actively steered, etc.

The UI 400 includes an interface element, for example, a takeover button 475, for requesting that remote motion and other function control, be engaged. Remote motion and other function control may only be actually engaged in response to the interface element when it is permitted by the network health monitor 280, as discussed above. A further interface element, for example a takeover indicator light 477, indicates when remote motion and other function control is engaged, and the wireless mobile device 200 is has control responsibility, and when remote control is disabled, and control responsibility is returned to the stationary main helm station of the vessel. Still further, the UI 400 includes an interface element, for example, a lock button 480, for disabling the UI to prevent inadvertent takeover of control responsibility, as well as an indicator, for example, a lock light 482, that indicates when the rest of the UI is disabled. It should be understood that a variety of other interface elements may alternatively be employed, and that the above discussed interface elements may be adapted for use in different implementations.

Figure 5:
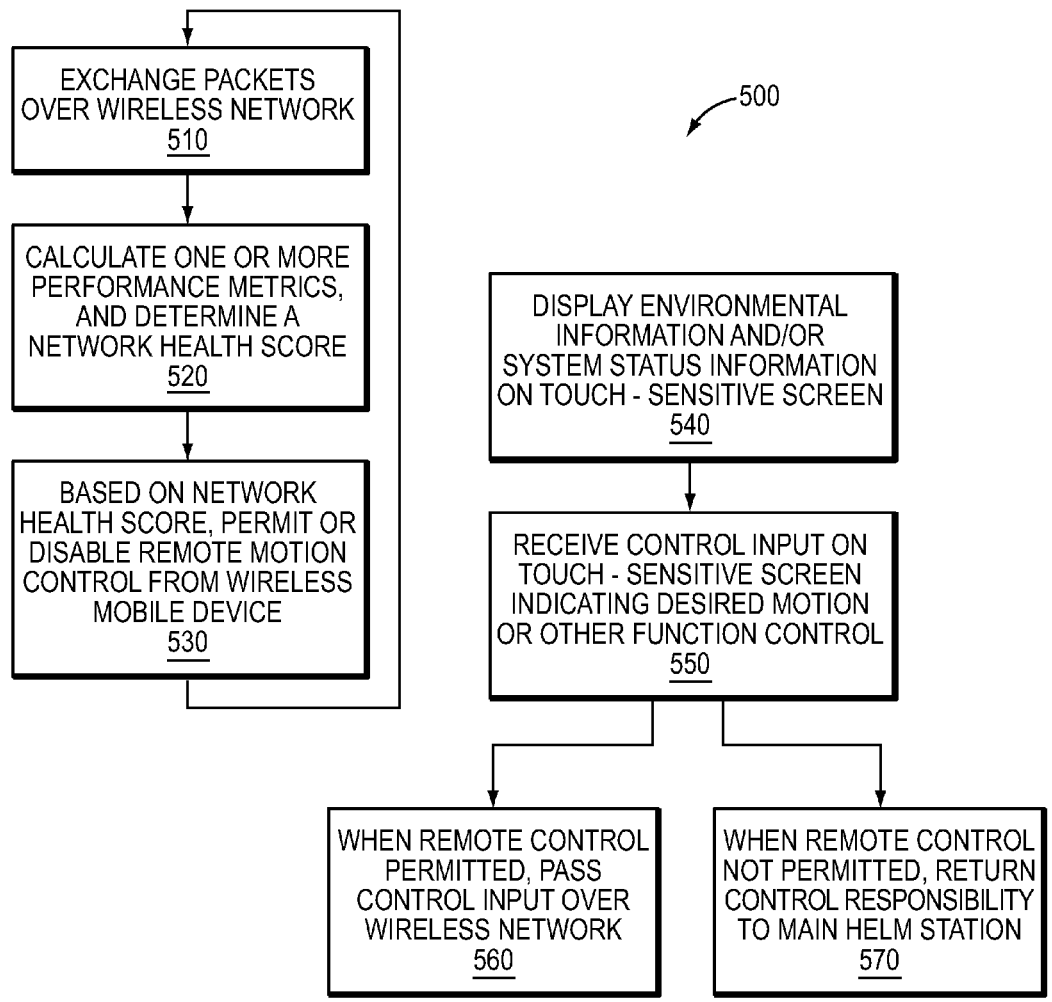
FIG. 5 is a flow diagram of an example sequence of steps for remote motion and other function control.

FIG. 5 is a flow diagram of an example sequence of steps 500 for remote motion and other function control. At step 510, the packet delivery module 270 of the wireless mobile device 200 exchanges packets over the wireless network 180 with the server 160, which is coupled via the wired network 104 with the electronic control system 102 of the vessel. At step 520, the network health monitor uses packet data, obtained from the packets exchanged with the server 160, to calculate one or more performance metrics, and determines a network health score from a combination of the one or more performance metrics. At step 530, based on the network health score, the network health monitor permits or disables remote motion and other function control from the wireless mobile device 200. Execution then loops back to step 510.

Concurrent to steps 510-530, at step 540, the UI module 290 displays environmental information and/or system status information for the vessel on the touch-sensitive screen 210 of the wireless mobile device 200. At step 550, the UI module receives control input on the touch-sensitive screen 210 indicating desired motion or other function control. At step 560, when remote motion and other function control is permitted, the packet delivery module 270 passes the control input over the wireless network 180 to the server 160, to cause the electronic control system 102 to issues control signals to subsystems to control motion and other functions of the vessel. A step 570, when remote motion and other function control is disabled, control responsibility is returned to the a main helm station 150 of the vessel.

Figure 6:
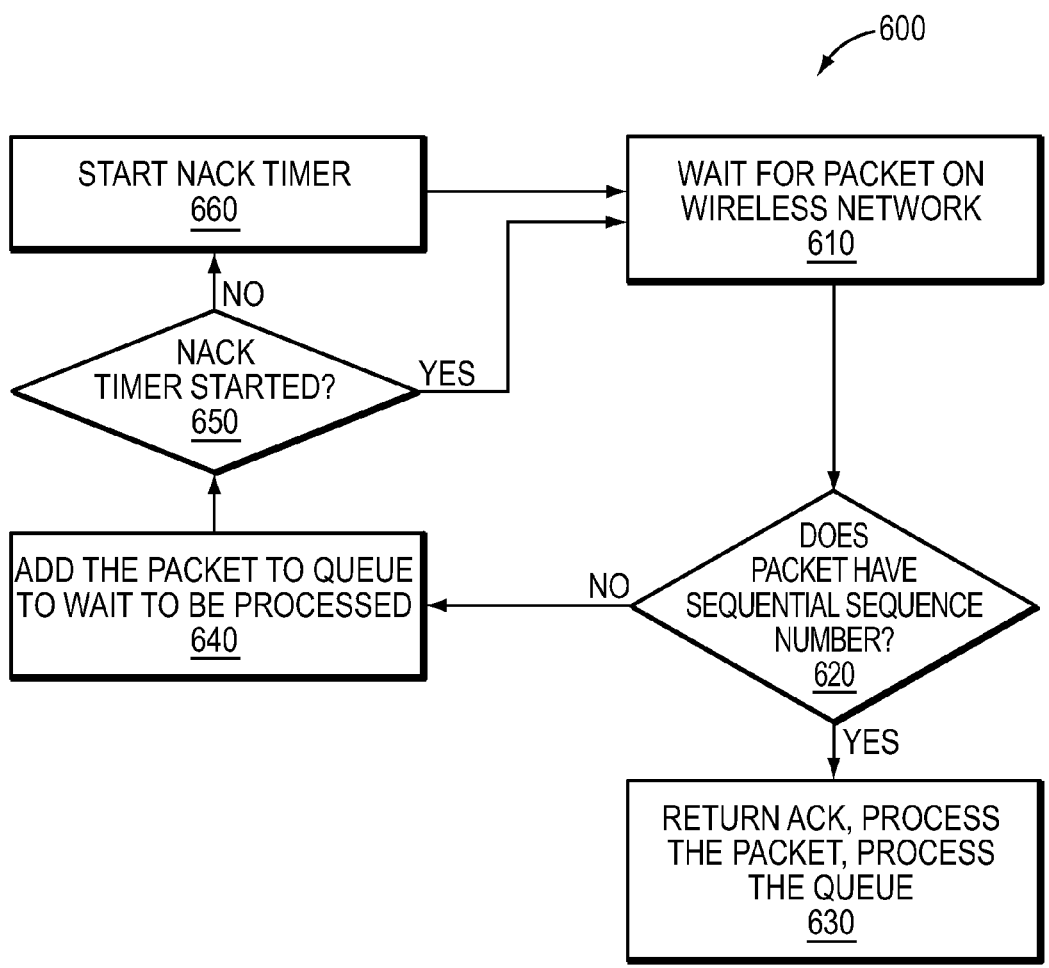
FIG. 6 is an flow diagram of an example sequence of steps for exchanging packets over a wireless network.

FIG. 6 is an flow diagram of an example sequence of steps 600 for exchanging packets over the wireless network 180. At least some of the steps 600 may be executed as part of step 510 of FIG. 5, when remote motion and other function control is permitted. At step 610, the packet delivery module 270 of the wireless mobile device 200 waits for a packet on the wireless network 180. Upon receipt of a packet, execution proceed to step 620, where the packet delivery module 270 determines if the packet has a sequential sequence number (as compared to a previous packet). If so, execution proceeds to step 630, where the packet delivery module 270 returns one or more packets that operate as ACKs, and the received packet and any packets in a packet queue are processed. If not, execution proceeds to step 640, where the received packet is added to a packet queue, to wait to be processed. Execution then proceeds to step 650, where it is determined if a NACK timer has already been started. The NACK timer operates to trigger the transmission of NACKs, at regular intervals, until a packet with the expected sequential sequence number is received. If the NACK timer is already started, execution loops back to step 610, where the packet delivery module 270 waits for another packet. If the NACK timer is not already start, execution proceeds to step 660, where the NACK timer is started, and then execution loops back to step 610.

It should be understood that various adaptations and modifications may be made within the spirit and scope of the embodiments discussed herein. It should be understood that at least some portions of the above-described techniques may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. Accordingly, it should be understood that the above descriptions are meant to be taken only by way of example.

What is claimed is:

1. A system comprising:
an interface coupled to an electronic control system of a vehicle; and
a general-purpose wireless mobile device having a touch-sensitive screen in communication with the interface via a wireless network, the general-purpose wireless mobile device configured to execute a remote control application that includes:
a packet delivery module configured to exchange packets with the interface over the wireless network,
a network health monitor configured to use packet data for packets exchanged during a sliding window having at least a predetermined length or a predetermined size to calculate one or more performance metrics, at least one of the one or more performance metrics being an instantaneous jitter metric, a cumulative delay metric, an average jitter metric or a retransmission metric to determine a
network health score for the wireless network based on the one or more performance metrics, to compare the network health score to a health threshold, and based on whether the network health score meets the health threshold, to permit or disable remote motion control of the vehicle via the general-purpose wireless mobile device, and
a user interface (UI) configured to display environmental information and/or system status information for the vehicle on the touch-sensitive screen of the general-purpose wireless mobile device, and to receive on the touch-sensitive screen control input indicating desired motion control for the vehicle,
wherein, when remote motion control via the general-purpose wireless mobile device is permitted, the control input is passed to the interface to cause the electronic control system to issue control signals to subsystems to control motion of the vehicle, and when remote motion control via the general-purpose wireless mobile device is disabled, motion control responsibility is returned to a main control interface of the vehicle.

2. The system of claim 1, wherein the UI module is configured to display an interface element in the UI that indicates when remote motion control is permitted and engaged, and when remote motion control is disabled.

3. The system of claim 1, wherein the packet delivery module is further configured to obtain the packet data from the packets exchanged with the interface over the wireless network.

4. The system of claim 3, wherein the packet delivery module is further configured to implement an acknowledgment (ACK)/negative acknowledgment (NACK) mechanism for the packets exchanged with the interface over the wireless network.

5. The system of claim 1, wherein the network health monitor is further configured to calculate two or more performance metrics from the packet data, and to determine the network health score from a combination of the two or more performance metrics.

6. The system of claim 1, wherein the electronic control system is coupled via a wired network to sensors that collect the environmental information and/or system status information for the vehicle.

7. The system of claim 1, wherein the electronic control system is coupled via a wired network to the subsystems of the vehicle that control motion of the vehicle.

8. The system of claim 1, wherein the vehicle is a marine vessel.

9. The system of claim 1, wherein the general-purpose wireless mobile device is a tablet computer.

10. A method comprising:
exchanging packets over a wireless network between a general-purpose wireless mobile device and an interface coupled to an electronic control system of a vehicle;
using packet data for packets exchanged during a sliding window having at least a predetermined length or a predetermined size to calculate one or more performance metrics, at least one of the one or more performance metrics being an instantaneous jitter metric, a cumulative delay metric, an average jitter metric or a retransmission metric; based on the one or more performance metrics, determining a network health score for the wireless network; comparing the network health score to a health threshold;

based on whether the network health score meets the health threshold, permitting or disabling remote motion control of the vehicle via the general-purpose wireless mobile device;

displaying environmental information and/or system status information for the vehicle on a touch-sensitive screen of the general-purpose wireless mobile device;

receiving, on the touch-sensitive screen of the general-purpose wireless mobile device, control input indicating desired motion control for the vehicle;

when remote motion control via the general-purpose wireless mobile device is permitted, passing the control input over the wireless network to the interface to cause the electronic control system to issue control signals to subsystems to control motion of the vehicle; and when remote motion control via the general-purpose wireless mobile device is disabled, returning motion control responsibility to a main control interface of the vehicle.

11. The method of claim 10, wherein further comprising:
display an interface element in the UI that indicates when remote motion control is permitted and engaged, and when remote motion control is disabled.

12. The method of claim 10, further comprising:
obtaining the packet data from the packets exchanged with the interface over the wireless network.

13. The method of claim 10, further comprising:
implementing an acknowledgment (ACK)/negative acknowledgment (NACK) mechanism for the packets exchanged with the interface over the wireless network.

14. The method of claim 10, further comprising:
calculating two or more performance metrics from the packet data; and
determining the network health score from a combination of the two or more performance metrics.

15. The method of claim 10, wherein the vehicle is a marine vessel.

16. The system of claim 10, wherein the general-purpose wireless mobile device is a tablet computer.

17. A non-transitory computer readable medium having software encoded thereon, the software when executed by a processor of a general-purpose wireless mobile device operable to:

exchange packets over a wireless network between a general-purpose wireless mobile device and an interface coupled to an electronic control system of a vehicle;

use packet data for packets exchanged during a sliding window having at least a predetermined length or a predetermined size to calculate one or more performance metrics, at least one of the one or more performance metrics being an instantaneous jitter metric, a cumulative delay metric, an average jitter metric or a retransmission metric; based on the one or more performance metrics, determine a network health score for the wireless network; compare the network health score to a health threshold;

based on whether the network health score meets the health threshold, permit or disable remote motion control of the vehicle via the general-purpose wireless mobile device;

display environmental information and/or system status information for the vehicle on a touch-sensitive screen of the general-purpose wireless mobile device;

receive, on the touch-sensitive screen of the general-purpose wireless mobile device, control input indicating desired motion control for the vehicle; and when remote motion control is permitted via the general-purpose wireless mobile device, pass the control input over the wireless network to the interface to cause the is electronic control system to issue control signals to subsystems to control motion of the vehicle; and when remote motion control via the general-purpose wireless mobile device is disabled, returning motion control responsibility to a main control interface of the vehicle.

18. A method comprising:
exchanging packets over a wireless network between a general-purpose wireless mobile device and an interface coupled to an electronic control system of a vehicle;

using packet data for packets exchanged during a sliding window having at least a predetermined length or a predetermined size to calculate two or more performance metrics, at least one of the two or more performance metrics being an instantaneous jitter metric, a cumulative delay metric, an average jitter metric or a retransmission metric;

determining a network health score for the wireless network based on a combination of the two or more performance metrics;

comparing the network health score to a health threshold;

based on whether the network health score meets the health threshold, permitting or disabling remote motion control of the vehicle via the general-purpose wireless mobile device;

receiving, on a touch-sensitive screen of the general-purpose wireless mobile device, control input indicating desired motion control for the vehicle;

when remote motion control via the general-purpose wireless mobile device is permitted, passing the control input over the wireless network to the interface to cause the electronic control system to issue control signals to subsystems to control motion of the vehicle; and when remote motion control via the general-purpose wireless mobile device is disabled, returning motion control responsibility to a main control interface of the vehicle that is separate from the general-purpose wireless mobile device.

* * * * *